United States Patent [19]
Duke et al.

[11] 3,959,411
[45] May 26, 1976

[54] PROCESS FOR IMPROVEMENT OF IMPACT STRENGTH IN RUBBER-MODIFIED NITRILE THERMOPLASTICS

[75] Inventors: June T. Duke, Chagrin Falls; B. Frank Vincent, Jr., Chesterland; Bruce O. Budinger, Cleveland; James L. O'Kane, Warrensville Heights, all of Ohio

[73] Assignee: Standard Oil Company, Cleveland, Ohio

[22] Filed: Oct. 31, 1973

[21] Appl. No.: 411,358

[52] U.S. Cl. ............................... 260/880 R; 260/879
[51] Int. Cl.² ........................ C08L 9/00; C08L 9/06
[58] Field of Search ..................... 260/879, 880 R

[56] References Cited
UNITED STATES PATENTS

| | | |
|---|---|---|
| 3,168,593 | 2/1965 | Fremon et al. .................... 260/880 |
| 3,370,105 | 2/1968 | De Bell et al. ..................... 260/879 |
| 3,442,979 | 5/1969 | Ott et al. ............................. 260/880 |
| 3,663,655 | 5/1972 | Sturt ................................... 260/880 |
| 3,819,762 | 6/1974 | Howe .................................. 260/879 |
| 3,855,355 | 12/1974 | Moore ........................... 260/880 R |
| 3,880,786 | 4/1975 | Feast et al. ..................... 260/880 R |

FOREIGN PATENTS OR APPLICATIONS

| | | |
|---|---|---|
| 6,704,344 | 9/1967 | Netherlands ....................... 260/880 |
| 1,185,306 | 3/1967 | United Kingdom | |

*Primary Examiner*—Joseph L. Schofer
*Assistant Examiner*—Maria S. Tungol
*Attorney, Agent, or Firm*—John F. Jones; Sherman J. Kemmer

[57] ABSTRACT

Improved impact strength of copolymers of acrylonitrile and styrene prepared in the presence of a diene rubber is achieved by presoaking the diene rubber with part of the acrylonitrile and styrene monomers prior to conducting the graft polymerization reaction.

5 Claims, No Drawings

PROCESS FOR IMPROVEMENT OF IMPACT STRENGTH IN RUBBER-MODIFIED NITRILE THERMOPLASTICS

The present invention relates to an improved process for the manufacture of impact-resistant, rubber-modified thermoplastic nitrile polymers, and more particularly pertains to a method for preswelling rubber particles in aqueous latex prior to the grafting polymerization onto the rubber particles of a major proportion of an olefinic nitrile monomer optionally with a minor proportion of at least one other monovinyl aromatic monomer, which method produces thermoplastic nitrile barrier resins of improved impact strength.

The resins produced by the process of the present invention are excellent barriers for gases and vapors including water vapor, oxygen, carbon dioxide, and the like.

We have discussed that a decided improvement in impact strength of thermoplastic nitrile homopolymer and copolymer barrier resins prepared in the presence of a diene elastomer can be made by preswelling the diene elastomer particles with at least a part of the monomers used in the graft polymerization. Impact-resistant resins which have commercial value because of their impact resistance are those having notched Izod impact values of at least 0.5 and preferably 1.0 or higher foot pounds per inch of notch.

The nitrile monomers useful in the present invention include those having the structure

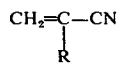

wherein R represents hydrogen, a lower alkyl group, and a halogen, and more preferably a hydrogen or an alkyl group having from 1 to 4 carbon atoms. Preferred for this invention are acrylonitrile and methacrylonitrile and most preferred is acrylonitrile.

The conjugated diene monomers useful in the present invention include butadiene-1,3, isoprene, chloroprene, bromoprene, cyanoprene, 2,3-dimethyl-butadiene-1,3, 2-ethylbutadiene-1,3, 2,3-diethyl-butadiene-1,3, and the like. Most preferred for the purpose of this invention are butadiene-1,3 and isoprene because of their ready availability and their excellent copolymerization properties.

The comonomers to be copolymerized with the essential nitrile monomer in this invention include the vinyl aromatic monomers.

Useful vinyl aromatic monomers include styrene, alphamethyl styrene, the vinyl toluenes, the vinyl xylenes, and the like. Most preferred is styrene.

Specific polymers useful in the process of this invention include those prepared by the polymerization in aqueous emulsion of 100 parts by weight of (A) at least 50% and preferably 70 to 90% by weight of at least one nitrile having the structure

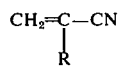

wherein R has the foregoing designation and (B) up to 50% and preferably 10 to 30% by weight based on the combined weights of (A) and (B) of a monovinyl aromatic monomer in the presence of from 1 to 40 parts by weight of (C) a rubbery polymer of a conjugated diene monomer selected from the group consisting of butadiene and isoprene and optionally at least one comonomer selected from the group consisting of a styrene and a nitrile having the structure

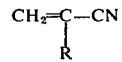

wherein R has the foregoing designation, said rubbery polymer containing from 50 to 100% by weight of polymerized conjugated diene and correspondingly 0 to 50% by weight of the comonomer wherein (C) is at least partially swollen by the (A) or a combination of the (A) and (B) components prior to the polymerization reaction.

Preferably, the rubbery polymer (C) is preswollen by from 1 to 50% by weight of the (A) or (A) plus (B) components, and more preferably from 1 to 25% by weight of (A) or (A) plus (B) wherein the weight ratio of (A)/(B) is in the range of from 1/10 to 10/1, respectively, in the (A) plus (B) component.

The more preferred process of this invention employs at least 70% by weight of (A) and up to 30% by weight of (B), and the most preferred process employs 70 to 90% by weight of (A) and 10 to 30% by weight of (B).

The polymers included in the process of this invention can be best prepared by emulsion or suspension polymerization in an aqueous medium by the continuous or intermittent addition of the monomers and other components to the aqueous medium which contains the preformed swollen diene elastomer in latex form. The preferred method is emulsion polymerization by the continuous addition of the monomers to the polymerization reaction medium during the course of the polymerization. The polymerization is preferably carried out in an aqueous medium in the presence of an emulsifier and a free-radical generating polymerization initiator at a temperature of from about 0° to 100°C in the substantial absence of molecular oxygen.

More specifically, the present invention can be illustrated in the polymerization of acrylonitrile and styrene in the presence of a preswollen preformed latex of a rubbery copolymer of butadiene and styrene, wherein the swelling agent is a mixture of a part of the acrylonitrile and styrene and wherein the remainder of the acrylonitrile and styrene monomers is added continuously to the polymerization mixture during the course of the polymerization reaction so as to form a homogeneous and uniform graft copolymer. The mechanism of the preswelling effect on improved impact is not known. Preswelling with styrene monomer alone does not give an improvement in impact strength of the final resin, and thus is outside the scope of the present invention.

The polymers useful in the process of the present invention are thermoplastic materials which are easily processed and can be thermoformed into a wide variety of useful articles in any of the conventional ways employed with well known thermoplastic polymeric materials such as by extrusion, milling, molding, drawing, blowing, etc. The polymers resulting from the process of this invention have excellent solvent resistance, including water-frost resistance, and their impact strength and low permeability to gases and vapors make them very useful in the packaging industry, and they are particularly useful in the manufacture of bottles, films, envelopes, boxes, and other types of containers for liquids and solids.

In the following examples, which will further illustrate this invention, the amounts of the various ingredients are given in parts by weight unless otherwise specified.

EXAMPLE 1

A. A butadiene-styrene rubber in latex form was prepared from the following recipe:

| Ingredient | Parts |
| --- | --- |
| butadiene | 75 |
| styrene | 25 |
| water | 200 |
| soap flakes | 1.5 |
| $K_2S_2O_8$ | 0.2 |
| Daxad 11* | 0.1 |
| t-dodecyl mercaptan | 0.65 |

*Naphthalene sulfonic acid-formaldehyde condensate-sodium salt.

The pH of the latex was about 10. The polymerization was carried out at 140°F in the substantial absence of molecular oxygen until about 90% conversion of monomers to polymer had occurred.

After the polymerization, nitrogen was bubbled through the latex to remove substantially all of the unreacted butadiene. The latex had a total solids of about 30%.

B. A resin which is outside the scope of the present invention was prepared as a control using the following procedure and ingredients. The latex of A above was diluted to 25% total solids with water. Some of this latex was placed in a polymerization reactor, the reaction was swept with nitrogen, and the balance of water, the emulsifier, and the initiator, which was dissolved in a small portion of the monomer mixture, was added to the reactor. The temperature was then rapidly raised to 60°C with continuous stirring. The total polymerization recipe is shown below:

| Ingredient | Parts |
| --- | --- |
| acrylonitrile | 75 |
| styrene | 25 |
| water (total including water in latex A) | 275 |
| n-dodecyl mercaptan | 0.5 |
| t-butyl peroxypivalate | 0.1 |
| latex A | 15 (solids basis) |
| sodium lauryl sulfate | 1.75 |

When the reaction mixture was at 60°C, the temperature and stirring were maintained throughout the reaction while the acrylonitrile-styrene mixture (which contained the mercaptan charge) was added slowly and at a uniform rate to the reactor over a period of 5 hours. The resin was then isolated by coagulation with aluminum sulfate solution, and the coagulated polymer was washed several times with fresh portions of warm water. The polymer was dried and was obtained in 84% yield. A compression molded test bar (4,000 psi, 195°C) was found to have a notched Izod impact value of 0.45 foot pounds per inch of notch and an ASTM heat distortion temperature of 96.5°C.

C. A resin within the scope of the present invention was prepared by placing in a polymerization reactor some of the diluted latex A described in B above and the following ingredients:

| Ingredient | Parts |
| --- | --- |
| acrylonitrile | 3.75 |
| styrene | 1.25 |
| latex A | 15 (rubber solids basis) |

The mixture was gently agitated to provide a homogeneous emulsion which then was allowed to stand overnight at ambient temperature. The next day the following ingredients were added with the exception of the monomer mixture and mercaptan:

| Ingredient | Parts |
| --- | --- |
| acrylonitrile | 71.25 |
| styrene | 23.75 |
| water (total) | 275 |
| n-dodecyl mercaptan | 0.5 |
| sodium lauryl sulfate | 1.75 |
| t-butyl peroxypivalate | 0.1 |

The reactor was purged with nitrogen, stirring was commenced, and the reaction temperature was brought to and maintained at 60°C. The remainder of the acrylonitrile-styrene mixture including the mercaptan was then added slowly and uniformly over a period of 5 hours. The resulting polymer was worked up and dried as in B above. The polymer was obtained in 86% yield and was found to have a notched Izod impact strength of 1.01 foot pounds per inch of notch and an ASTM heat distortion temperature of 100°C. The gas and vapor barrier properties of this resin were determined on compression molded discs of resin. The following results were obtained:

| | | |
| --- | --- | --- |
| Water Vapor Transmission | (ASTM E96-63-E) | 4.8 |
| Oxygen Transmission | (ASTM D1434-66) | 2.9 |
| $CO_2$ Transmission | (ASTM D1434-66) | 12.9 |

EXAMPLE 2

A. A terpolymer rubber of butadiene/styrene/acrylonitrile 75/15/10 was prepared in emulsion by the procedure given in Example 1A using the following ingredients:

| Ingredient | Parts |
| --- | --- |
| butadiene | 75 |
| styrene | 15 |
| acrylonitrile | 10 |
| water | 200 |
| t-dodecyl mercaptan | 0.4 |
| azobisisobutyronitrile | 0.4 |
| soap flakes | 2.0 |

The final emulsion had about 30% total solids.

B. A resin which is outside the scope of the present invention was prepared following the procedure of Example 1B using the following ingredients:

| Ingredient | Parts |
| --- | --- |
| acrylonitrile | 75 |
| styrene | 25 |
| latex A | 15 (solids basis) |
| water (total) | 275 |
| 2,2'-azobis-(2,4-dimethyl valeronitrile) | 0.1 |
| n-dodecyl mercaptan | 0.5 |

| Ingredient | Parts |
|---|---|
| sodium lauryl sulfate | 1.0 |

The final yield of the dried resin was 82%. This resin was found to have a notched Izod impact strength of 0.71 foot pounds per inch of notch.

C. A resin within the scope of the present invention was prepared according to the procedure of Example 1C using the following ingredients in the first step:

| Ingredient | Parts |
|---|---|
| acrylonitrile | 5.25 |
| styrene | 1.75 |
| latex A (diluted as in Example 1B) | 15 (solids basis) |

The resulting emulsion prepared as in Example 1C was allowed to stand overnight at ambient temperature. The next day the following ingredients were added to the polymerization medium:

| Ingredient | Parts |
|---|---|
| acrylonitrile | 69.75 |
| styrene | 23.25 |
| water (total) | 275 |
| n-dodecyl mercaptan | 0.5 |
| 2,2'-azobis-(2,4-dimetyl valeronitrile) | 0.1 |
| sodium lauryl sulfate | 1.0 |

The final conversion of monomers to polymer was 82%. The resin was found to have a notched Izod impact strength of 1.60 foot pounds per inch of notch.

D. The procedure 2C of this Example was repeated except that the first step was carried out only for 40 minutes. The final resin was obtained in 85% yield and was found to have an Izod impact value of 1.77 foot pounds per inch of notch.

EXAMPLE 3

A. A butadiene/styrene 75/25 rubber was prepared in aqueous emulsion by the procedure of Example 1A using the following ingredients:

| Ingredient | Parts |
|---|---|
| butadiene | 75 |
| styrene | 25 |
| water | 200 |
| azobisisobutyronitrile | 0.4 |
| t-dodecyl mercaptan | 0.5 |
| soap flakes | 2.0 |

The final latex had a total solids content of about 30%.

B. The procedure of Example 2D was repeated using latex A of this Example 3. The polymer was found to have a notched Izod impact strength of 1.1 foot pounds per inch of notch. Conversion of monomer to polymer was about 80%.

C. The procedure of this Example 3B was repeated except that 11.35 parts of acrylonitrile and 3.65 parts of styrene were used in the first or swelling step and 63.65 parts of acrylonitrile and 21.35 parts of styrene were used in the main polymerization step. The final resin was found to have a notched Izod impact value of 1.01 foot pounds per inch of notch. Conversion of monomer to polymer was about 80%.

EXAMPLE 4

A. The procedure of Example 1A was repeated except that a rosin acid soap was used in place of the soap flakes, azobisisobutyronitrile was used in place of the $K_2S_2O_8$, and no mercaptan was used. This rubber had a gel content of 95%.

B. A resin which is outside the scope of this invention was prepared by placing in a polymerization reactor some of the latex described in A of this Example and styrene in the following proportions:

| Ingredient | Parts |
|---|---|
| styrene | 10 |
| latex A | 15 (rubber solids basis) |

The mixture was gently agitated to provide a homogeneous emulsion and was allowed to stand for 2 hours at ambient temperature. At the end of this time, the following ingredients were added with the exception of the monomer-mercaptan mixture:

| Ingredient | Parts |
|---|---|
| acrylonitrile | 75 |
| styrene | 15 |
| water (total) | 275 |
| n-dodecyl mercaptan | 0.5 |
| sodium lauryl sulfate | 1.75 |
| t-butyl peroxypivalate | 0.1 |

The reactor was purged with nitrogen, stirring was commenced, and the reaction temperature was brought to and maintained at 65°C. The remainder of the acrylonitrile-styrene and mercaptan mixture was then added slowly and uniformly over a period of 5 hours. The resulting polymer was worked up and dried. The polymer was obtained in 76% yield and was found to have a notched Izod impact strength of 0.4 foot pounds per inch of notch, an ASTM heat distortion temperature of 83°C, poor clarity, and a Brabender plasticorder torque reading of 1500 meter grams at 230°C and 35 rpm.

C. Resin which is within the scope of this invention was prepared by placing in a polymerization reactor some of the latex described in A of this Example and acrylonitrile in the following proportions:

| Ingredient | Parts |
|---|---|
| acrylonitrile | 10 |
| latex A | 15 (rubber solids basis) |

The mixture was gently agitated to provide a homogeneous emulsion and was allowed to stand for 2 hours at ambient temperature. At the end of this time, the following ingredients were added with the exception of the monomer-mercaptan mixture:

| Ingredient | Parts |
|---|---|
| acrylonitrile | 65 |
| styrene | 25 |
| water (total) | 275 |
| n-dodecyl mercaptan | 0.5 |
| sodium lauryl sulfate | 1.75 |

| Ingredient | Parts |
| --- | --- |
| t-butyl peroxypivalate | 0.1 |

The reactor was purged with nitrogen, stirring was commenced, and the reaction temperature was brought to and maintained at 65°C. The remainder of the acrylonitrile-styrene and mercaptan mixture was then added slowly and uniformly over a period of 5 hours. The resulting polymer was worked up and dried. The polymer was obtained in 71% yield and was found to have a notched Izod impact strength of 1.7 foot pounds per inch of notch, an ASTM heat distortion temperature of 89°C, and a Brabender plasticorder torque reading of 1100 meter grams at 230°C and 35 rpm.

D. A resin according to the present invention was prepared by placing in a polymerization reactor some of the latex described in A of this Example, styrene, and acrylonitrile in the following proportions:

| Ingredient | Parts |
| --- | --- |
| styrene | 6.5 |
| acrylonitrile | 3.5 |
| latex A | 15 (rubber solids basis) |

The mixture was gently agitated to provide a homogeneous emulsion and was allowed to stand for 2 hours at ambient temperature. At the end of this time, the following ingredients were added with the exception of the monomermercaptan mixture:

| Ingredient | Parts |
| --- | --- |
| acrylonitrile | 71.5 |
| styrene | 18.5 |
| water (total) | 275 |
| n-dodecyl mercaptan | 0.5 |
| sodium lauryl sulfate | 1.75 |
| t-butyl peroxypivalate | 0.1 |

The reactor was purged with nitrogen, stirring was commenced, and the reaction temperature was brought to and maintained at 65°C. The remainder of the acrylonitrile-styrene and mercaptan mixture was then added slowly and uniformly over a period of 5 hours. The resulting polymer was worked up and dried. The polymer was obtained in 79% yield and was found to have a notched Izod impact strength of 1.1 foot pounds per inch of notch, good clarity, an ASTM heat distortion temperature of 81°C, and a Brabender plasticorder torque reading of 1200 meter grams at 230°C and 35 rpm.

E. The procedure of D of this Example was repeated except that the following ingredients were used in the first step:

| Ingredient | Parts |
| --- | --- |
| styrene | 2.5 |
| acrylonitrile | 7.5 |
| latex A | 15 (rubber solids basis) |

In the second step, the following ingredients were used:

| Ingredient | Parts |
| --- | --- |
| acrylonitrile | 67.5 |
| styrene | 22.5 |
| water (total) | 275 |
| n-dodecyl mercaptan | 0.5 |
| sodium lauryl sulfate | 1.75 |
| t-butyl peroxypivalate | 0.1 |

The resulting polymer, which is within the scope of this invention, was obtained in 79% yield and was found to have a notched Izod impact strength of 2.8 foot pounds per inch of notch, good clarity, an ASTM heat distortion temperature of 89°C, and a Brabender plasticorder torque reading of 1400 meter grams at 230°C and 35 rpm.

F. The procedure of E of this Example was repeated except that 10 parts (rubber solids basis) of latex A were used in the first step. The resulting polymer was comparable to that of E with slightly lower Izod impact strength.

EXAMPLE 5

A. Example 2A was repeated except that 0.9 parts of n-dodecyl mercaptan and 0.4 parts of azobisisobutyronitrile were used and GAFAC RS-710 (GAFAC RS-710 is α-tridecyl-omegahydroxypoly (oxyethylene) phosphate) was used as emulsifier in place of the soap flakes.

B. The procedure of Example 4B was repeated using latex A of this Example to produce a resin outside the scope of the present invention. The resin was obtained in 81% yield and was found to have poor clarity, a notched Izod impact strength of 0.2 foot pounds per inch of notch, an ASTM heat distortion temperature of 81°C and a Brabender plasticorder torque reading of 2000 meter grams at 230°C and 35 rpm.

C. The procedure of Example 4C was repeated using latex A of this Example. The resulting resin, which is within the scope of the present invention, was obtained in 78% yield and was found to have a notched Izod impact strength of 2.2 foot pounds per inch of notch, as ASTM heat distortion of 91°C and a Brabender plasticorder torque reading of 2180 meter grams at 230°C and 35 rpm.

D. A resin within the scope of the present invention was prepared by the procedure in Example 4D except that 5 parts of acrylonitrile and 5 parts of styrene were used in the first step and a mixture of 70 parts of acrylonitrile and 20 parts of styrene was used in the second step. The resin was obtained in 74% yield and was found to have good clarity, a notched Izod impact strength of 1.4 foot pounds per inch of notch, an ASTM heat distortion temperature of 83°C and a Brabender plasticorder torque reading of 1500 meter grams at 230°C and 35 rpm.

E. A polymer within the scope of the present invention was prepared by procedure D of this Example except that 7 parts of acrylonitrile and 3 parts of styrene were used in the first step and a mixture of 68 parts of acrylonitrile and 22 parts of styrene was used in the second step. The resulting resin was obtained in 76% yield and was found to be of good clarity, having a notched Izod impact strength of 2.5 foot pounds per inch of notch, an ASTM heat distortion temperature of 86°C and a Brabender plasticorder torque reading of 1900 meter grams at 230°C and 35 rpm.

F. A resin within the scope of the present invention was prepared by procedure D of this Example except that 9 parts of acrylonitrile and 1 part of styrene were used in the first step and a mixture of 66 parts of acrylonitrile and 24 parts of styrene was used in the second step. The resulting resin was obtained in 75% yield and was found to have good clarity, a notched Izod impact strength of 2.8 foot pounds per inch of notch, an ASTM heat distortion temperature of 90°C and a Brabender plasticorder torque reading of 2500 meter grams at 230°C and 35 rpm.

We claim:

1. The process for preparing resins having improved impact resistance comprising polymerizing in an aqueous emulsion 100 parts by weight of
   A. from 70 to 90% by weight of at least one nitrile having the structure

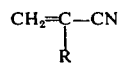

wherein R represents hydrogen, a lower alkyl group, and a halogen, and
   B. from 10 to 30% by weight based on the combined weights of (A) and (B) of a monovinyl aromatic monomer
in the presence of from 1 to 40 parts by weight of
   C. a rubbery polymer of a conjugated diene monomer selected from the group consisting of butadiene and isoprene and optionally at least one comonomer selected from the group consisting of styrene and a nitrile having the structure

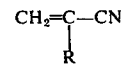

wherein R has the foregoing designation, said rubbery polymer containing from 50 to 100% by weight of polymerized conjugated diene and correspondingly 0 to 50% by weight of the comonomer, said rubbery polymer being in the form of an aqueous latex wherein
(C) is at least partially swollen by from 1 to 50% by weight of (A) or (A) plus (B) with gentle mixing of only the (A) or (A) plus (B) components and allowing the mixed components to stand for at least 40 minutes prior to the polymerization reaction and wherein the remaining (A) or (A) plus (B) components are added continuously during the course of the polymerization.

2. The process of claim 1 wherein (A) is acrylonitrile.

3. The process of claim 2 wherein (B) is styrene.

4. The process of claim 3 wherein the (A) plus (B) used to swell (C) is present in the weight ratio falling in the range of 1/10 to 10/1.

5. The process of claim 2 wherein (C) is swollen by from 1 to 25% by weight of (A) or (A) plus (B).

* * * * *